United States Patent [19]
Albrecht

[11] Patent Number: 6,137,928
[45] Date of Patent: Oct. 24, 2000

[54] OPTICAL FIBER LIGHT DISTRIBUTION SYSTEM AND METHOD OF MANUFACTURE AND ILLUMINATION

[76] Inventor: Richard E. Albrecht, 3804 High Meadow Rd., Chapel Hill, N.C. 27514

[21] Appl. No.: 09/240,221

[22] Filed: Jan. 29, 1999

[51] Int. Cl.[7] ....................................................... G02B 6/26
[52] U.S. Cl. .............................. 385/31; 385/147; 362/551
[58] Field of Search ................................... 385/31–33, 39, 385/123, 125, 129, 147; 362/551, 552, 559–561, 582

[56] References Cited

U.S. PATENT DOCUMENTS

| | | |
|---|---|---|
| 4,389,085 | 6/1983 | Mori . |
| 4,422,719 | 12/1983 | Orcutt . |
| 4,460,940 | 7/1984 | Mori . |
| 4,471,412 | 9/1984 | Mori . |
| 4,765,701 | 8/1988 | Cheslak . |
| 4,822,123 | 4/1989 | Mori . |
| 5,222,795 | 6/1993 | Hed . |
| 5,452,186 | 9/1995 | Dassanayake . |
| 5,631,994 | 5/1997 | Appeldron et al. . |
| 5,836,669 | 11/1998 | Hed . |

OTHER PUBLICATIONS

Brochure: *Lumenyte Flexcoat Clear Flexible Optical Fib er,* Lumenyte International corp., Costa Mesa, CA Jan. 5, 1996.

*Primary Examiner*—James Phan
*Attorney, Agent, or Firm*—Stout, Uxa, Buyan & Mullins, LLP; Donald E. Stout

[57] ABSTRACT

An optical fiber light distribution system has a first optical fiber and a second optical fiber. The first optical fiber has a side surface, an axis, and a length. The second optical fiber is wrapped about the side surface such that the second optical fiber defines a plurality of wraps about the first optical fiber. The plurality of wraps have a pitch. Pitch is the distance between corresponding points of adjacent wraps measured parallel to the first optical fiber axis. When light is directed through the first optical fiber, portions of the light are extracted by portions of the second optical fiber that contact the first optical fiber. The lower the pitch of the plurality of wraps, the greater the percentage of light extracted into the second optical fiber from the first optical fiber. Further, softer first optical fibers which incur more deformation have increased contact surface with the second optical fiber. The increased contact surface results in an increased percentage of light being extracted into the second optical fiber. Cladding or potting may be used to inhibit light extraction. A process for making the optical fiber distribution system has the step of wrapping the second optical fiber about the first optical fiber. A process for illumination has the step of directing light through the optical fiber light distribution system.

21 Claims, 2 Drawing Sheets

OPTICAL FIBER LIGHT DISTRIBUTION SYSTEM AND METHOD OF MANUFACTURE AND ILLUMINATION

BACKGROUND OF THE INVENTION

1. Field of the Invention

This invention relates to optical fiber devices and methods of manufacture and, more specifically, to side light emitting optical fiber devices and methods of manufacture.

2. Description of the Related Art

Optical fibers, a special case of optical waveguides, have found a large number of applications in transferring at low losses electromagnetic waves and particularly visible and infrared light over long distances. Such uses are common in fields as varied as telecommunication and laser surgery. In most of these cases the design goals for the optical fibers is to minimize optical losses of the carried beam through the optical fiber, and thus the materials used are usually glasses with minimal optical losses. When short distances are contemplated, polymers having higher optical losses are often used.

Traditional optical fibers consist of a core and a cladding with respective indices of refraction. In order to assure complete internal reflection of the transmitted light within a fiber or a waveguide, the index of refraction of the cladding is always smaller than that of the core. This assures that all light within the acceptance angle of the fiber is internally reflected at the core/cladding interface.

Numerous applications of optical fibers bundles to illumination are known. In most cases the fiber bundle is simply used to conduct the light to the remote location and the light is emitted from the open end of these fibers. In some instances, it is desirable to conduct electromagnetic waves along a single guide and extract light along a given length of the guide's distal end rather than only at the guide's terminating face. This special need has been recognized in the prior art and numerous approaches to the extraction of light at intervals from optical waveguides or optical fibers have been proposed. Each of these proposals, however, has its specific shortcomings making the application impractical or limited to only few situations.

For instance, Orcutt in U.S. Pat. No. 4,422,719, which is incorporated by reference in it's entirety herein, proposes the extraction of light from a light guide by enclosing the waveguide within a transparent sleeve having an index of refraction greater than the index of refraction of the waveguide and embedding within the sleeve light-reflecting powders, or by providing other discontinuities such as cuts or air bubbles within the fiber core. This approach has a number of shortcomings. First, the light extraction rate along the guide declines monotonically (and quite rapidly) from the proximal end to the distal end. The higher index of refraction of the cladding causes conversion of core modes (light propagation mode) to cladding modes to occur at the proximal end or the composite guide, thus sharply depleting the beam intensity as the light traverses the full length of the guide. Furthermore, the use of particles and bubbles suspended within the cladding causes excessive absorption of the light in the transmitting medium (particularly the cladding itself). Orcutt attempts to overcome the lack of light extraction control by including in the core refracting discontinuities or "light extraction" cuts through the cladding to the core and spacing these as a function of the distance from the light source. This approach is difficult to implement and furthermore, creates a series of pin point light sources along the guide and does not allow for continuous light extraction.

Mori (U.S. Pat. Nos. 4,460,940, 4,471,412 and 4,822,123, which are incorporated by reference in their entirety herein) uses discrete light diffusing elements on a light transmission element to extract light from said light guide. In U.S. Pat. No. 4,460,940, Mori uses convex or concave diffusing elements to extract light of a specific wavelength, and a set of discrete elements with increasing density (but constant thickness) toward the distal end of the transmitting medium to extract light (presumably all wavelengths) from the transmitting element.

In U.S. Pat. Nos. 4,471,412 and 4,822,123, Mori uses discrete light outlets on a light conducting member. In the former patent he uses discrete diffusing elements without consideration to their quantitative light extraction capabilities while in U.S. Pat. No. 4,822,123 he uses light scattering discrete elements and simply increases their number as he approaches the distal end of the light conductor. The disadvantages of Mori's light extraction systems include discontinuity of the light sources in that the appearance of the device includes a plurality of concentrated light sources, and the great difficulty in correctly spacing and sizing the extraction elements to provide for controlled light extraction from the light guide. Furthermore, the manufacturing and assembly of the devices of Mori is awkward and costly.

Cheslak U.S. Pat. No. 4,765,701, which is incorporated by reference in it's entirety herein, also uses pinpoint elements to extract light from an optical fiber in conjunction with a panel. Cheslak uses angular recesses and does not provide for means to control quantitatively the light extraction, and as a result, the illumination from the downstream (distal) recesses is progressively lower.

Hed U.S. Pat. No. 5,222,795, which is incorporated by reference in it's entirety herein, discloses making controlled light emissions from optical fibers that is not discrete. Hed discloses making a triangular zone in the surface of the optical fiber through which the percentage of light emitted is controlled. Hed also discloses having a rectangular zone in the surface and controlling the percentage of light emission by the use of a cladding with changing indexes of refraction. To modify the optical fibers in this manner is difficult in practice, especially for longer lengths of optical fibers.

The prior art as described is thus wanting in the areas of controlled light extraction from optical fibers and waveguides and to the extent that a minimal control is gained, the prior art provides light output that occurs in pinpoint segments or a continuous manner that is limited in application.

SUMMARY OF THE INVENTION

In an aspect of the invention, an optical fiber light distribution system comprises a first optical fiber and a second optical fiber. The first optical fiber has a side surface, an axis, and a length. The second optical fiber is wrapped about the side surface such that the second optical fiber defines a plurality of wraps about the first optical fiber. The plurality of wraps have a pitch, wherein the pitch is a distance between corresponding points of adjacent wraps measured parallel to the first optical fiber axis. The first optical fiber may have a diameter that is greater than a diameter of the second optical fiber.

In further aspects of the invention, the pitch varies along the first optical fiber length. The pitch may increase or decrease along the length of the first optical fiber length in some aspects of the invention.

In an aspect of the invention, cladding is disposed on a portion of the side surface of the first optical fiber.

In an aspect of the invention, a light source functionally connected to the first optical fiber.

In an aspect of the invention, the first optical fiber and the second optical fiber are sized and arranged to emit a substantially even amount of light along a length of the optical fiber light distribution system for a predetermined intensity of light entering the first optical fiber.

In an aspect of the invention, a securing system at least partially surrounds the first and second optical fibers.

In another aspect of the invention, a process for manufacturing an optical fiber light distribution system comprising the step of providing a first optical fiber having a side surface, an axis, and a length. The process also comprises the step of wrapping a second optical fiber about the side surface such that the second optical fiber defines a plurality of wraps about the first optical fiber and the plurality of wraps have a pitch.

In an aspect of the invention, the pitch of the plurality of wrapped fibers made according to the process varies along the length of the first optical fiber, and may increase or decrease along it's length. The first optical fiber may have a diameter that is greater than a diameter of the second optical fiber.

In an aspect of the invention, cladding may be applied to a portion of the surface of the first optical fiber.

In an aspect of the invention, a light source may be functionally connected to the first optical fiber.

In an aspect of the invention, an illumination process comprises the steps of providing an optical fiber light distribution system and directing light to the system. The optical fiber distribution system has been previously described. The light is directed to the first optical fiber in the system and portions of the light being transmitted therethrough are extracted by the second optical fiber.

DESCRIPTION OF THE PREFERRED EMBODIMENTS

Figure 1:
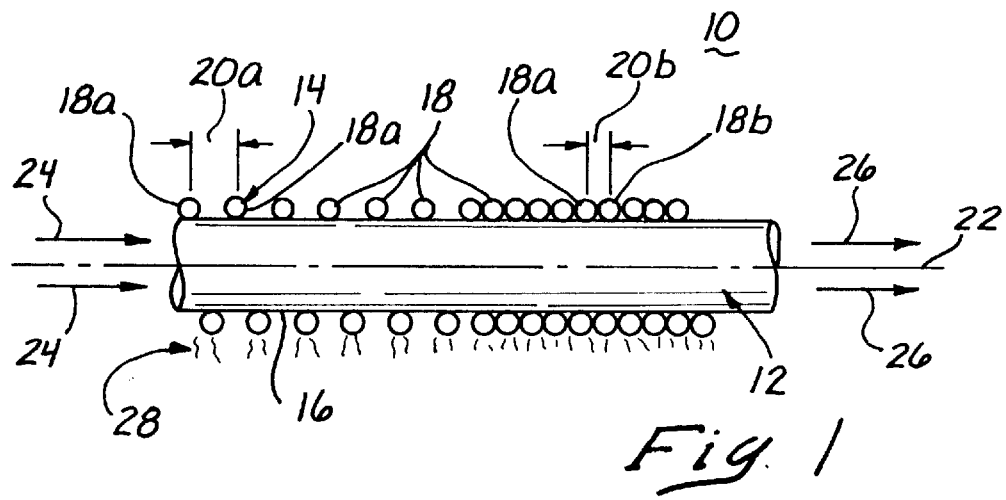
FIG. 1 shows a cross-sectional side view of an optical fiber light distribution system according to an embodiment of the invention.

Referring now to the figures, wherein like reference numerals refer to like elements throughout the figures, and referring specifically to FIG. 1, an optical fiber light distribution system 10 comprises a first optical fiber, or core fiber, 12 and a second optical fiber, or wrapped fiber, 14. The wrapped fiber 14 operates as the core fiber 12 has an outside surface 16.

The wrapped fiber 14 is wrapped about the surface 16 to form a plurality of wraps 18. Referring now to the left side of FIG. 1, adjacent wraps 18a are separated by a pitch 20a. Pitch is a distance between corresponding points of adjacent wraps measured parallel to the core fiber axis 22. Further, adjacent wraps 18b, shown to the right side of FIG. 1, are separated by a pitch 20b. The pitch 20a is greater than the pitch 20b.

Light 24 is shown entering the core fiber 12 in an axial direction from the left. A transmitted light 26 is shown exiting the core fiber in an axial direction to the right. Emitted light 28 is shown being emitted from the wrapped fiber 14. In the shown embodiment, although emitted light 28 is shown graphically emitting in a downward direction, the emitted light 28 radiates from portions of the wrapped fiber 14 that are in contact with the core fiber 12 when there is transmitted light present at the surface 16 of the core fiber.

The light 24 entering the core fiber 12 is equal to the transmitted light 26 plus the emitted light 28 minus energy losses. The wraps 18 emit the light 28 as a result of the wraps being in contact with the surface 16 of the core fiber 14. Where the wraps 18 contact the surface 16, the total internal reflection (TIR) of the core fiber 12 is frustrated. The frustrated TIR results in light leaking out of the core fiber 12 and into the wraps 18. Once the light is in the wraps 18, it gets diffused into the surroundings as emitted light 28. The pitch 20 of the plurality of wraps is shown to decrease from left to right.

The pitch 20 decreases from left to right to have an increasing percentage of the transmitted light 24 removed from the core fiber 12 as emitted light 28. The increasing percentage of light 24 removal compensates for the reduction in transmitted light 24 remaining in the core fiber 12 as the light passes through it. In a preferred embodiment of the invention, the system 10 is designed to produce an even amount of emitted light 28 along the length of the system for a predetermined intensity of light 24. In other embodiments of the invention, the amount of emitted light 28 being produced along the length of the system 10 may increase, decrease, or vary.

The invention encompasses other means for increasing the percentage of light 24 directed through the surface 16, into the wrapped fiber 14, and ultimately becoming emitted light 28. The smaller the diameter of the wrapped fiber 14, the more contact with the surface 16, resulting in more frustration of the TIR and more emitted light 28 being produced. Different materials for the fibers 12 and 14 with different indexes of refraction will influence the amount of light 24 removed from the core fiber 12.

Figure 2A:
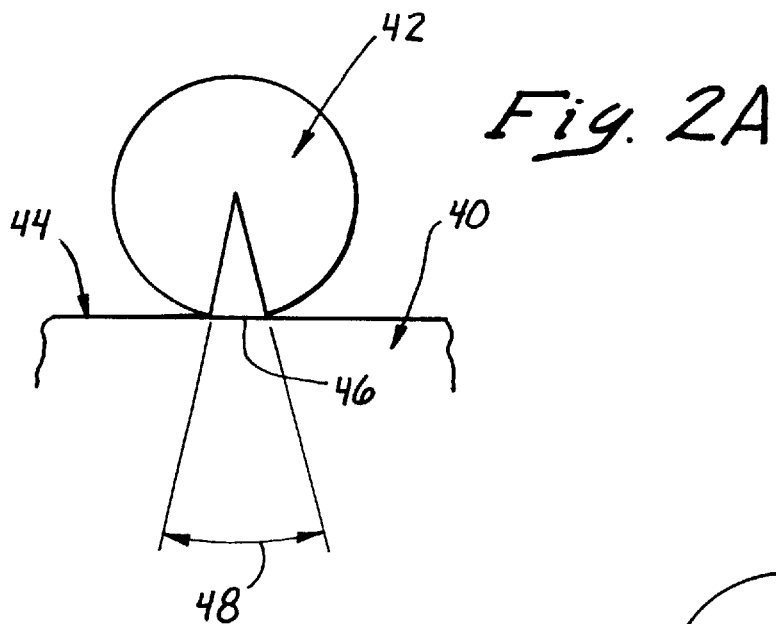
FIGS. 2A and 2B show cross-sectional views demonstrating differences in contact area between an optical fiber applied to a surface of a relatively hard core fiber versus a relatively soft core fiber.
Figure 2B:
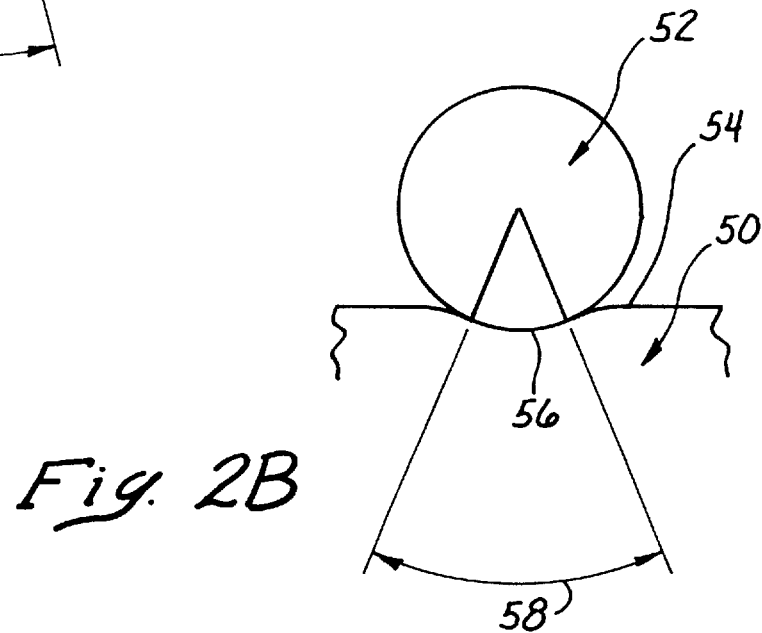

The type of material used for the core fiber 12 will have an influence on the amount of emitted light 28 produced. Core fiber 40 shown in FIG. 2a is comprised of a harder material than core fiber 50 of FIG. 2b. A wrapping fiber 42 is shown placed against a surface 44 and without any significant deformation of the wrapping core fiber. The wrapping fiber 42 has a contact area 46 against the surface 44 and a contact angle 48 is formed. A wrapping fiber 52 is shown placed against a surface 54. The wrapping fiber 52 has a contact area 56 against the surface 54 and a contact angle 58 is formed. Due to the softness of the core fiber 50, the surface 54 is deflected and deformed in contrast to contact region 46 of the harder core fiber 40. The reduced deformation of the harder core fiber 40 results in a smaller contact area 46 and contact angle 48 compared to the contact area 56 and contact angle 58 of the more deformed and softer core fiber 50. With the increase in contact area, there is an increase in the frustration of the TIR. Additionally, the deflections in the side wall of the soft core fiber 50 increase the reflected angle of the light passing along the fiber. The differences in the deformation of the core fibers have the net effect of a decrease in the numerical aperture and an increase in the amount of light being extracted from the softer core fiber 50 and a resulting increase in emitted light.

Figure 3:
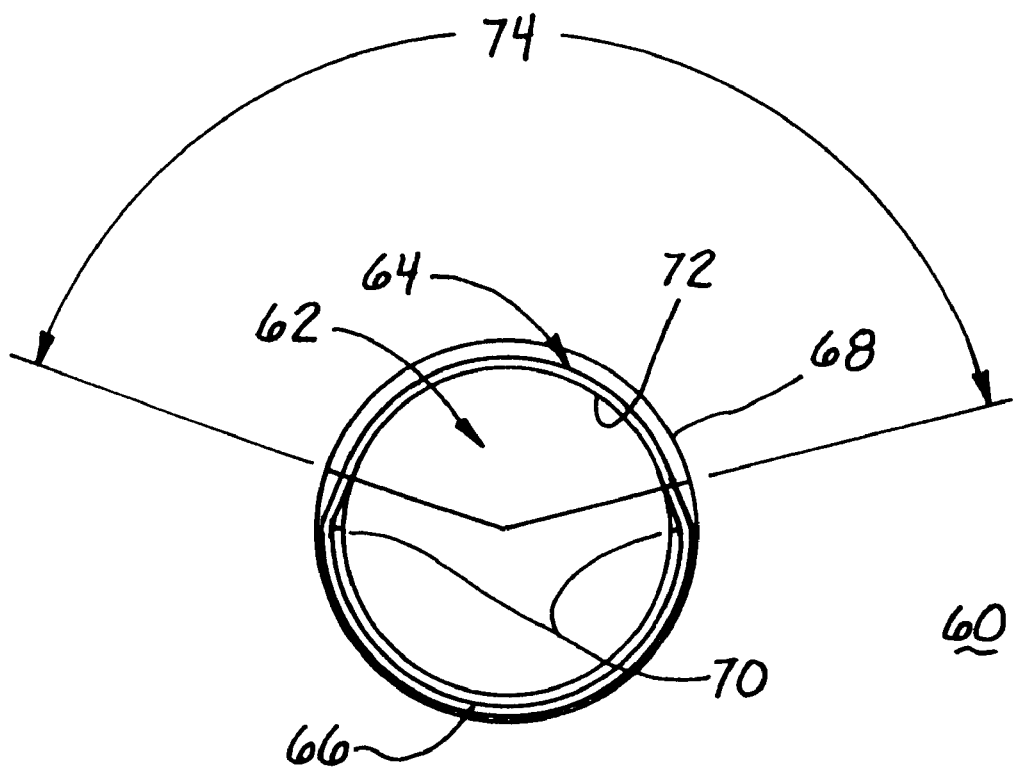
FIG. 3 shows a cross-sectional view of an optical light distribution system with cladding partially disposed on a surface of the core fiber.

Referring now to FIG. 3, an optical fiber light distribution system 60 has a core fiber 62, a wrapped fiber 64, a partial cladding 66 and a casing 68. The wrapped fiber 64 is wrapped around the core fiber 62 as in system 10. The cladding 66 is disposed on a portion 70 of a surface 72 of the core fiber 62. The disposition of the cladding 66 results in a contact angle 74 of the wrapped fiber 64 with the surface 72 of the core fiber 62. The cladding 66 inhibits light leaking from the core fiber 62 to the wrapped fiber 64. The less leakage of light, the more light that can pass through the core fiber 62 to be used at a more distant location. The casing 68 is a light transmitting cover surrounding the core fiber 62/casing 66/wrapped fiber 64 arrangement. Other embodiments of the invention may not have a casing or may have another means for protecting the system 60.

Other embodiments of the invention may have other means for controlling the emission of light from an optical fiber light distribution system. An example of such a means is that the cross section of the core fiber may have any shape or size and may vary in shape and size along the length of the core fiber.

Other embodiments may include a securing system for holding the wrapped fibers in place. In one embodiment, the securing system is the casing 68 shown in FIG. 3. In another embodiment of the invention, the securing system is adhesive to adhere the wrapped fiber to the core fiber and/or the cladding if present. In another embodiment of the invention, a frame work secures the fibers in place. In another embodiment of the invention, a housing that is at least partial light transmitting at least partially encloses the core fiber/wrapped fiber arrangement. Other embodiments of the invention may have other suitable securing systems.

In an embodiment of the invention, a light source is functionally connected to the core fiber of an optical fiber light distribution system.

In an embodiment of the invention, the optical fibers may be comprised of any suitable, light transmitting fibers. In an embodiment of the invention, any of the optical fibers may be comprised of a plurality of light transmitting fibers.

In an embodiment of the invention, an optical fiber light distribution system is manufactured by providing a first optical fiber having a side surface, an axis, and a length. Then, a second optical fiber is wrapped about the side surface such that the second optical fiber defines a plurality of wraps about the first optical fiber and the plurality of wraps have a pitch, wherein the pitch is a distance between corresponding points of adjacent wraps measured parallel to the first optical fiber axis. Embodiments of the invention include manufacturing any of the different embodiments of the optical fiber light distribution systems disclosed herein or equivalents thereto.

In an embodiment of the invention, a portion of an optical fiber light distribution system is potted in a material, such as room temperature vulcanizing material (RTV). The potting may serve at least two purposes. First, potting secures the plurality of wrapping in place. Second, if the potting material and the two fibers have significantly the same index of refraction, and the outer surface of the potting material is smooth, light passing through the potting material region is not extracted by the wrapping fibers in that region. As a result, potting the wrapped core fiber has a result similar to partially cladding the core fiber in limiting the extraction of light. The potting material may cover a constant angular contact area of the outer surface along the length of the system, for example the contact area may define continuous 180 degree section of the wrapped core fiber. In other embodiments of the invention, the contact area of the potting material may vary over the length of the core fiber, providing another means for varying the percentage of light extracted from the core fiber over the length of the system.

In an embodiment of the invention, an optical fiber light distribution system is used for illumination purposes by providing any of the different embodiments of the optical fiber light distribution systems disclosed herein or equivalents thereto and directing light through the core fiber.

Although presently preferred embodiments of the present invention have been described in detail hereinabove, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. An optical fiber light distribution system comprising:
   a. a first optical fiber having a side surface, an axis, and a length; and
   b. a second optical fiber wrapped about the side surface such that the second optical fiber defines a plurality of wraps about the first optical fiber and the plurality of wraps have a pitch, wherein the pitch is a distance between corresponding points of adjacent wraps measured parallel to the first optical fiber axis.

2. The optical fiber light distribution system of claim 1, wherein the pitch varies along the first optical fiber length.

3. The optical fiber light distribution system of claim 2, wherein the pitch increases along the first optical fiber length.

4. The optical fiber light distribution system of claim 2, wherein the pitch decreases along the first optical fiber length.

5. The optical fiber light distribution system of claim 1, wherein the first optical fiber has a diameter greater than a diameter of the second optical fiber.

6. The optical fiber light distribution system of claim 1, further comprising cladding disposed on a portion of the side surface of the first optical fiber.

7. The optical fiber light distribution system of claim 1, further comprising a light source functionally connected to the first optical fiber.

8. The optical fiber light distribution system of claim 1, wherein the first optical fiber and the second optical fiber are sized and arranged to emit a substantially even amount of light along a length of the optical fiber light distribution system for a predetermined intensity of light entering the first optical fiber.

9. The optical fiber light distribution system of claim 1, further comprising a securing system at least partially surrounding the first and second optical fibers.

10. An optical fiber light distribution system comprising:
    a. a first optical fiber having a side surface, an axis, and a length; and
    b. a second optical fiber wrapped about the side surface such that the second optical fiber defines a plurality of wraps about the first optical fiber and the plurality of wraps have a pitch, wherein the pitch is a distance between corresponding points of adjacent wraps measured parallel to the first optical fiber axis;
    c. wherein the pitch decreases along the first optical fiber length; and d. a first optical fiber diameter that is greater than a second optical fiber diameter.

11. The system of claim 10, further comprising a light source functionally connected to the first optical fiber.

12. The system of claim 10, further comprising cladding disposed on a portion of the side surface of the first optical fiber.

13. The system of claim 10, further comprising a light source functionally connected to the first optical fiber.

14. A process for manufacturing an optical fiber light distribution system comprising the steps of:
   a. providing a first optical fiber having a side surface, an axis, and a length; and
   b. wrapping a second optical fiber about the side surface such that the second optical fiber defines a plurality of wraps about the first optical fiber and the plurality of wraps have a pitch, wherein the pitch is a distance between corresponding points of adjacent wraps measured parallel to the first optical fiber axis.

15. The process of claim 14, wherein the pitch varies along the first optical fiber length.

16. The process of claim 15 wherein the pitch increases along the first optical fiber length.

17. The process of claim 15, wherein the pitch decreases along the first optical fiber length.

18. The process of claim 14, wherein the first optical fiber has a diameter greater than a diameter of the second optical fiber.

19. The process of claim 14, further comprising the step of applying cladding to a portion of the surface of the first optical fiber.

20. The process of claim 14, further comprising the step of functionally connecting a light source to the first optical fiber.

21. An illumination process comprising the steps of:
   a. providing an optical fiber light distribution system comprising:
      i. a first optical fiber having a side surface, an axis, and a length; and
      ii. a second optical fiber wrapped about the side surface such that the second optical fiber defines a plurality of wraps about the first optical fiber and the plurality of wraps have a pitch, wherein the pitch is a distance between corresponding points of adjacent wraps measured parallel to the first optical fiber axis; and
   b. directing light through the first optical fiber.

* * * * *